United States Patent
Venkitasubramony et al.

(10) Patent No.: US 9,022,071 B2
(45) Date of Patent: May 5, 2015

(54) MULTI-STAGE FLUID FLOW CONTROL DEVICE

(71) Applicant: Control Components, Inc., Rancho Santa Margarita, CA (US)

(72) Inventors: Sadasivan Venkitasubramony, Aluva (IN); Sujith Elayattil Parambil, Malappuram (IN)

(73) Assignee: Control Components, Inc., Rancho Santa Margarita, CA (US)

( * ) Notice: Subject to any disclaimer, the term of this patent is extended or adjusted under 35 U.S.C. 154(b) by 82 days.

(21) Appl. No.: 13/827,462

(22) Filed: Mar. 14, 2013

(65) Prior Publication Data
US 2013/0276924 A1 Oct. 24, 2013

Related U.S. Application Data (60) Provisional application No. 61/637,715, filed on Apr. 24, 2012.

(51) Int. Cl.
| | |
|---|---|
| *F16K 47/08* | (2006.01) |
| *F16K 47/04* | (2006.01) |
| *F16K 1/42* | (2006.01) |

(52) U.S. Cl.
CPC ............... *F16K 47/04* (2013.01); *F16K 47/08* (2013.01); *F16K 1/42* (2013.01)

(58) Field of Classification Search
CPC .................................. F16K 47/04; F16K 47/08
USPC .................... 137/625.33–625.39; 251/118
See application file for complete search history.

(56) References Cited

U.S. PATENT DOCUMENTS

| | | | | |
|---|---|---|---|---|
| 1,582,896 | A | * | 5/1926 | Berry ............................ 137/495 |
| 1,645,601 | A | * | 10/1927 | Lee ................................ 251/122 |
| 3,317,184 | A | * | 5/1967 | Usry .............................. 251/122 |
| 3,730,224 | A | * | 5/1973 | Prisk ......................... 137/625.33 |
| 3,791,413 | A | * | 2/1974 | Muller et al. ............... 137/625.3 |
| 3,851,668 | A | * | 12/1974 | Benjamin .................. 137/625.3 |
| 3,971,411 | A | | 7/1976 | Baumann |
| 4,549,718 | A | * | 10/1985 | Seger ............................ 251/121 |
| 5,765,814 | A | | 6/1998 | Dvorak et al. |
| 5,803,119 | A | | 9/1998 | Steinke |
| 6,293,514 | B1 | * | 9/2001 | Pechoux et al. .............. 251/122 |
| 2009/0183790 | A1 | | 7/2009 | Moore |

OTHER PUBLICATIONS

International Search Report and Written Opinion for International Application No. PCT/US2013/037649; 7 pages, Jul. 25, 2013.

* cited by examiner

*Primary Examiner* — John Fox
(74) *Attorney, Agent, or Firm* — Stetina Brunda Garred & Brucker (57) ABSTRACT

A control valve which includes a uniquely configured seat ring outfitted with flow passages adapted to operatively interact with a valve plug in a manner providing prescribed pressure reduction characteristics in a fluid flowing through the flow passages. The seat ring of the control valve of the present invention is preferably fabricated through the use of a direct metal laser sintering (DMLS) process. The use of the DMLS process to facilitate the fabrication of the seat ring in the control valve allows for the creation of more intricate and complex flow passages therein. Such increased intricacy/complexity provides better flow range/rangeability within the control valve.

20 Claims, 7 Drawing Sheets

MULTI-STAGE FLUID FLOW CONTROL DEVICE

CROSS-REFERENCE TO RELATED APPLICATIONS

The present application claims priority to U.S. Provisional Patent Application Ser. No. 61/637,715 entitled Multi-Stage Fluid Flow Control Device filed Apr. 24, 2012.

STATEMENT RE: FEDERALLY SPONSORED RESEARCH/DEVELOPMENT

Not Applicable

BACKGROUND OF THE INVENTION

1. Technical Field of the Invention

The present invention relates generally to flow control devices and, more particularly, to a pintle-type control valve which includes a uniquely configured seat ring outfitted with flow passages adapted to operatively interact with a valve plug in a manner providing prescribed pressure reduction characteristics in a fluid flowing through the flow passages.

2. Description of the Related Art

There is currently known in the prior art a type of control valve commonly referred to as a pintle valve wherein the short extension of a needle-valve tip is used to facilitate the control of fluid through the valve. An exemplary pintle-type fluid flow control device or control valve is described with particularity in Applicant's U.S. Pat. No. 5,803,119 entitled FLUID FLOW CONTROL DEVICE issued Sep. 8, 1998.

In one embodiment of the control valve described in the '119 Patent, a cylindrical plug is moveable axially within a complimentary cylinder. The plug includes a fluid flow path extending axially therein. As the plug is moved axially relative to the cylinder, the area of path entry available for fluid flow and the length of the fluid flow path is varied. As a result, as the plug moves further out of the cylinder, a corresponding increase in fluid flow is obtained in the control valve.

The flow control device or control valve constructed in accordance with the present invention represents an improvement over the control valve described in the '119 Patent by virtue of its inclusion of more intricate and complex flow passages which are formed in the seat ring of the control valve, rather than in the reciprocally moveable plug thereof. The increased intricacy/complexity of the flow passages within the control valve of the present invention provides for a better flow range/rangeability therethrough. These, as well as other features and advantages of the present invention, will be described in more detail below.

BRIEF SUMMARY OF THE INVENTION

In accordance with the present invention, there is provided a pintle-type control valve which includes a uniquely configured seat ring outfitted with flow passages adapted to operatively interact with a valve plug in a manner providing prescribed pressure reduction characteristics in fluid flowing through the flow passages. The seat ring of the control valve of the present invention is preferably fabricated through the use of a direct metal laser sintering (DMLS) process as is described with particularity in Applicant's co-pending U.S. application Ser. No. 12/018,088 entitled DIRECT METAL LASER SINTERED FLOW CONTROL ELEMENT filed Jan. 22, 2008, the entirety of which is incorporated herein by reference. The use of the DMLS process to facilitate the fabrication of the seat ring in the control valve allows for the creation of more intricate and complex flow passages therein. Such increased intricacy/complexity provides better flow range/rangeability within the control valve.

In the control valve of the present invention, a flow path is collectively defined by the seat ring and the valve plug. This flow path preferably consists of one or more flow passages formed within the seat ring, such flow passage(s) being uniquely configured to facilitate a pressure drop along various stages defined thereby. More particularly, each flow passage consists of a series of right angle turns which facilitate a pressure drop in multiple stages, thus providing a prescribed level of velocity control, and further increasing flow control and trim life within the control valve. The flow passage(s) within the seat ring extend in generally parallel relation to the axis of the valve plug, with pressure thus being dropped in an axial direction. Flow variation through the control valve is effected by the number of turns within the flow passage(s) within the seat ring which are exposed/not exposed as the plug reciprocally moves up and down relative thereto. In other words, the length of the flow path is selectively increased or decreased based on the orientation of the plug relative to the seat ring, thereby effectuating a change in the flow rate through the control valve.

The formation of the flow passage(s) in an axial orientation extending in general parallel relation to the axis of the valve plug provides the advantage of a compact design, since there is no impact on the diameter of the valve gallery of the control valve, even when additional stages are added for an increased pressure drop. This in turn allows for a higher available number of pressure dropping stages at lower openings, which provides better low range throttling and higher rangeability. Further, velocity control at full opening in the control valve may be ensured by providing an adequate number of stages after the full opening of the plug. The formation of the flow passage(s) in the seat ring provides the additional advantage of potentially having expanding flow areas which assist in optimizing the pressure drop stages, and further increasing the aforementioned rangeability of the control valve. In the control valve, the clearance flow control at the initial opening thereof is controlled through a series of labyrinth grooves formed in the seat ring. In addition, clearance flow control grooves (CFCG's) are preferably formed within the seat ring and located at different intervals along the flow path to provide additional clearance flow control in lower and mid-range operation of the control valve.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
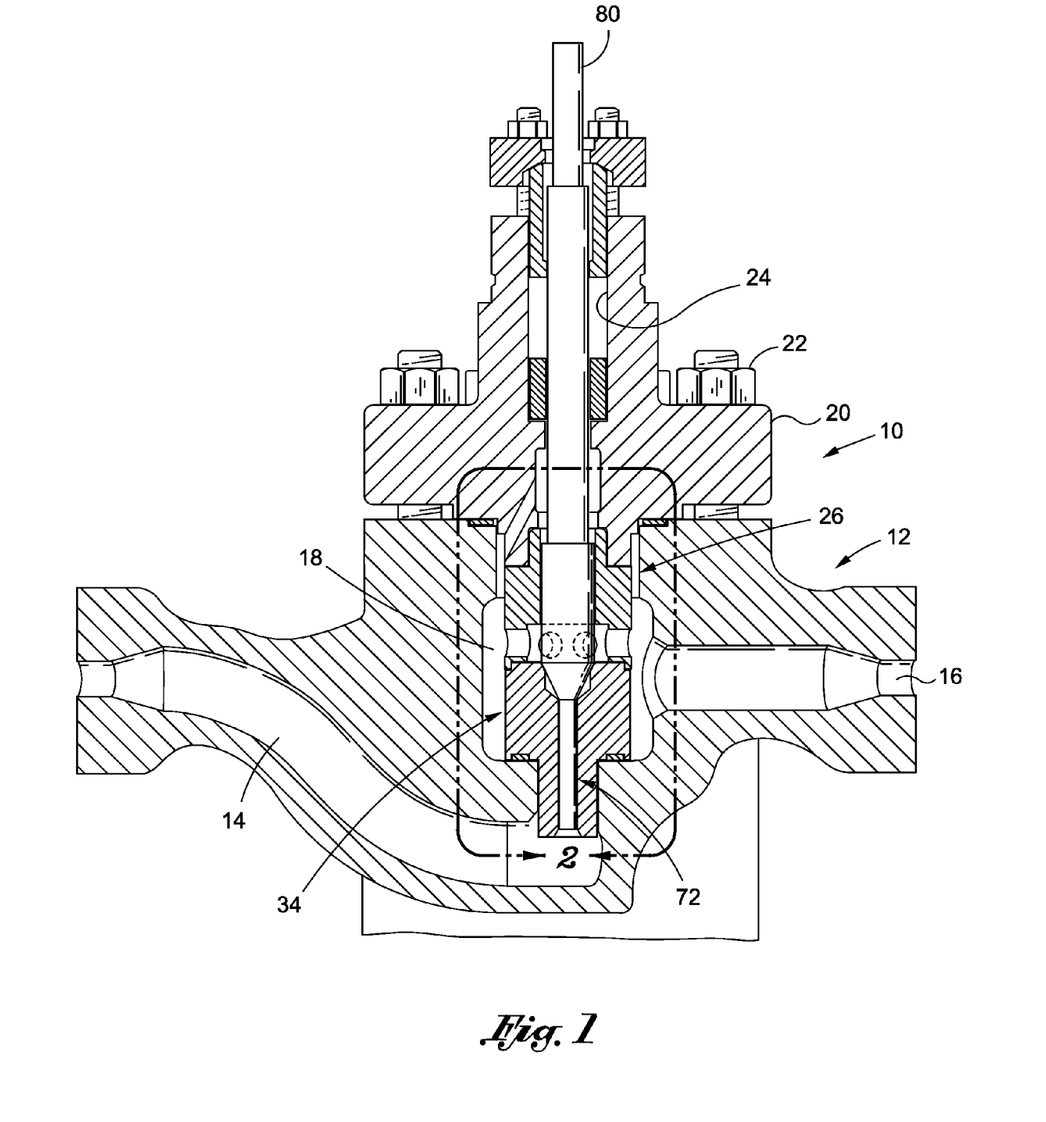
FIG. 1 is a cross-sectional view of a control valve constructed in accordance with the present invention, illustrating the plug thereof in a closed position.
Figure 2:
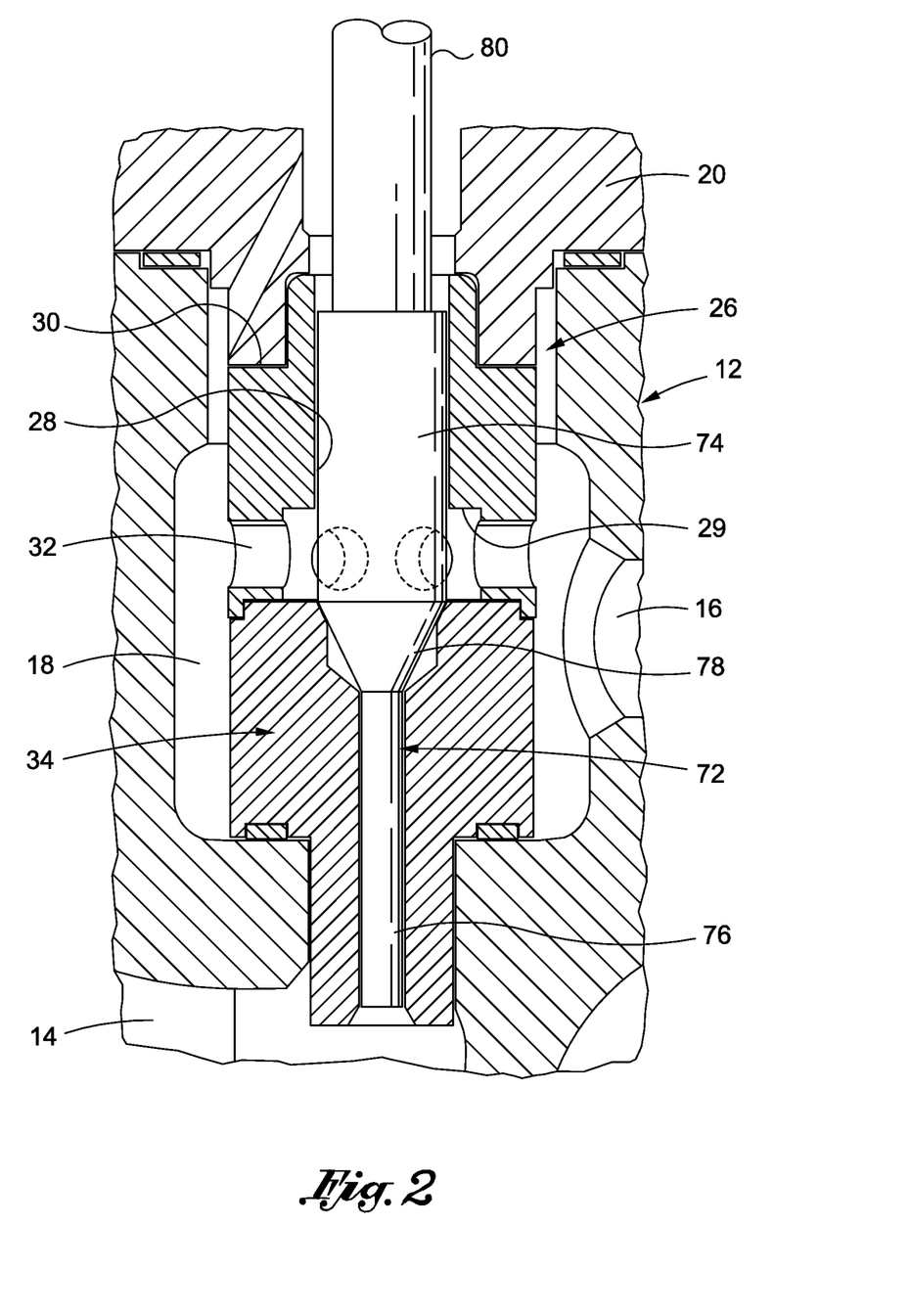
FIG. 2 is an enlargement of a portion of the control valve shown in FIG. 1.

Referring now to the drawings wherein the showings are for purposes of illustrating a preferred embodiment of the present invention only, and not for purposes of limiting the same, FIGS. 1 and 2 are cross-sectional views of a control valve 10 constructed in accordance with the present invention. As will be described in more detail below, the valve 10 is shown in FIGS. 1 and 2 in a closed or shut-off position.

The valve 10 comprises a valve body 12 which defines an inflow passage 14 and an outflow passage 16. The inflow and outflow passages 14, 16 each fluidly communicate with an interior chamber or valve gallery 18 partially defined by the body 12. In addition to the body 12, the valve 10 includes a bonnet 20 which is attached to the body 12 and partially encloses the gallery 18. As seen in FIGS. 1 and 2, the attachment of the bonnet 20 to the body 12 is preferably facilitated through the use of mechanical fasteners 22 comprising a nut and bolt combination, though other attachment methods are contemplated to be within the spirit and scope of the present invention. The bonnet 20 defines a bore 24 which extends axially therethrough, the use of which will be described in more detail below.

Disposed within the gallery 18 of the body 12 is an annular guide bushing 26. When viewed from the perspective shown in FIG. 2, the guide bushing 26 defines generally cylindrical upper and lower portions which collectively define an elongate bore 28 extending axially through the guide bushing 26. The bore 28 is not of a uniform inner diameter. Rather, when viewed from the perspective shown in FIG. 2, the bore 28 defines an upper portion which is of a first inner diameter, and a lower portion which is of a second inner diameter exceeding the first inner diameter. As a result, the upper and lower portions of the bore 28 are separated from each other by a continuous, annular shoulder 29 defined by the guide bushing 26.

Similarly, the cylindrically configured upper and lower portions of the guide bushing 26 are not of a uniform outer diameter. Rather, when viewed from the perspective shown in FIGS. 1 and 2, the upper portion is of a first outer diameter, with the lower portion being of a second outer diameter exceeding the first outer diameter. As a result, the upper and lower portions of the guide bushing 26 are separated from each other by a continuous, annular shoulder 30. Formed in the lower portion of the guide bushing 26 are a plurality of circularly configured outflow openings 32. As is best seen in FIG. 2, each of the outflow openings 32 extends from the outer surface of the lower portion of the guide bushing 26 to the lower portion of the bore 28 which, as indicated above, is of an increased inner diameter in comparison to the upper portion thereof. As such, each of the outflow openings 32 effectively places the bore 28 into fluid communication with the valve gallery 18, and hence the outflow passage 16. As is further seen in FIG. 2, the outflow openings 32 extend radially relative to the axis of the bore 28 in prescribed angular intervals relative to each other.

Figure 3:
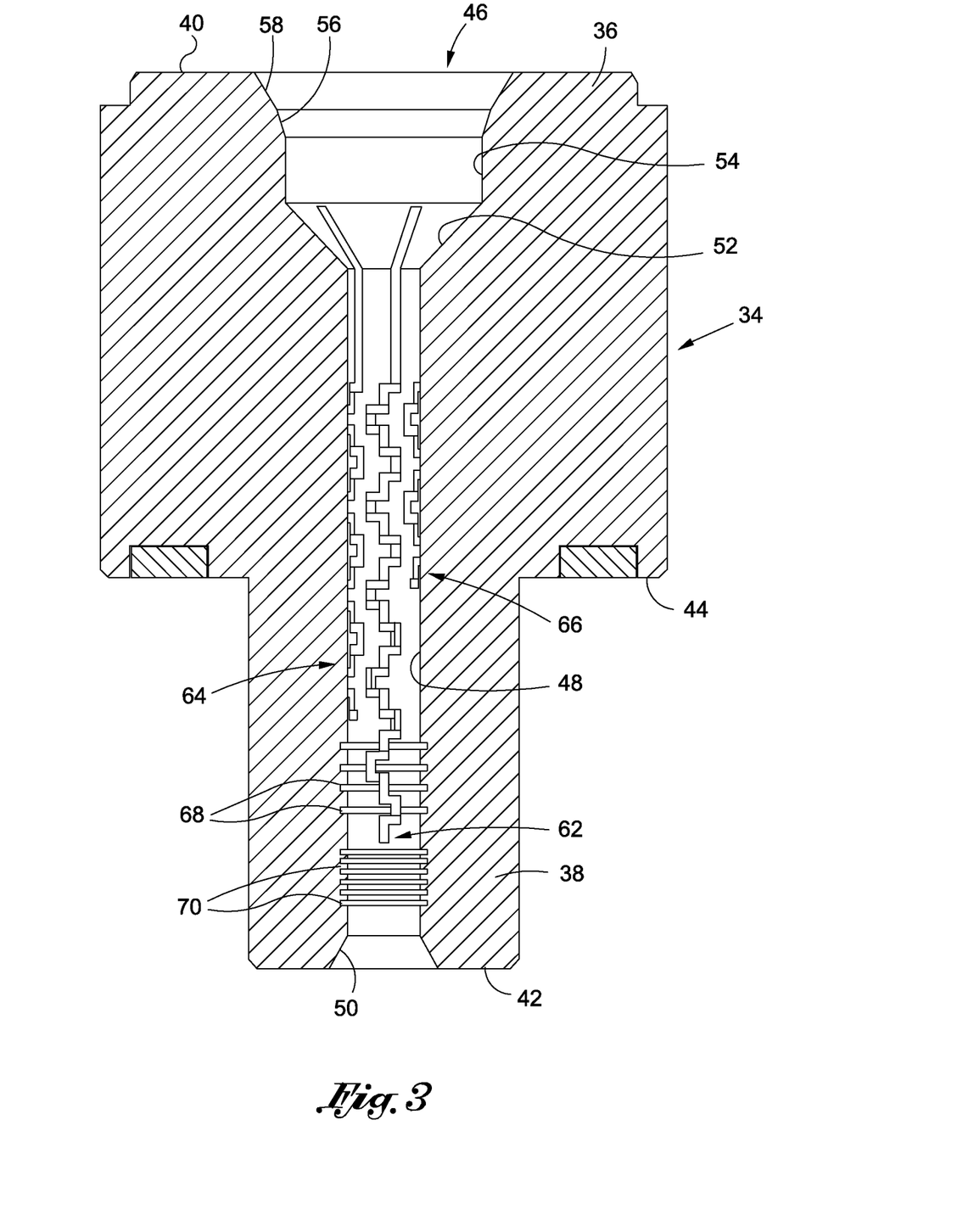
FIG. 3 is a cross-sectional view of an exemplary embodiment of the seat ring of the control valve shown in FIGS. 1 and 2.
Figure 4:
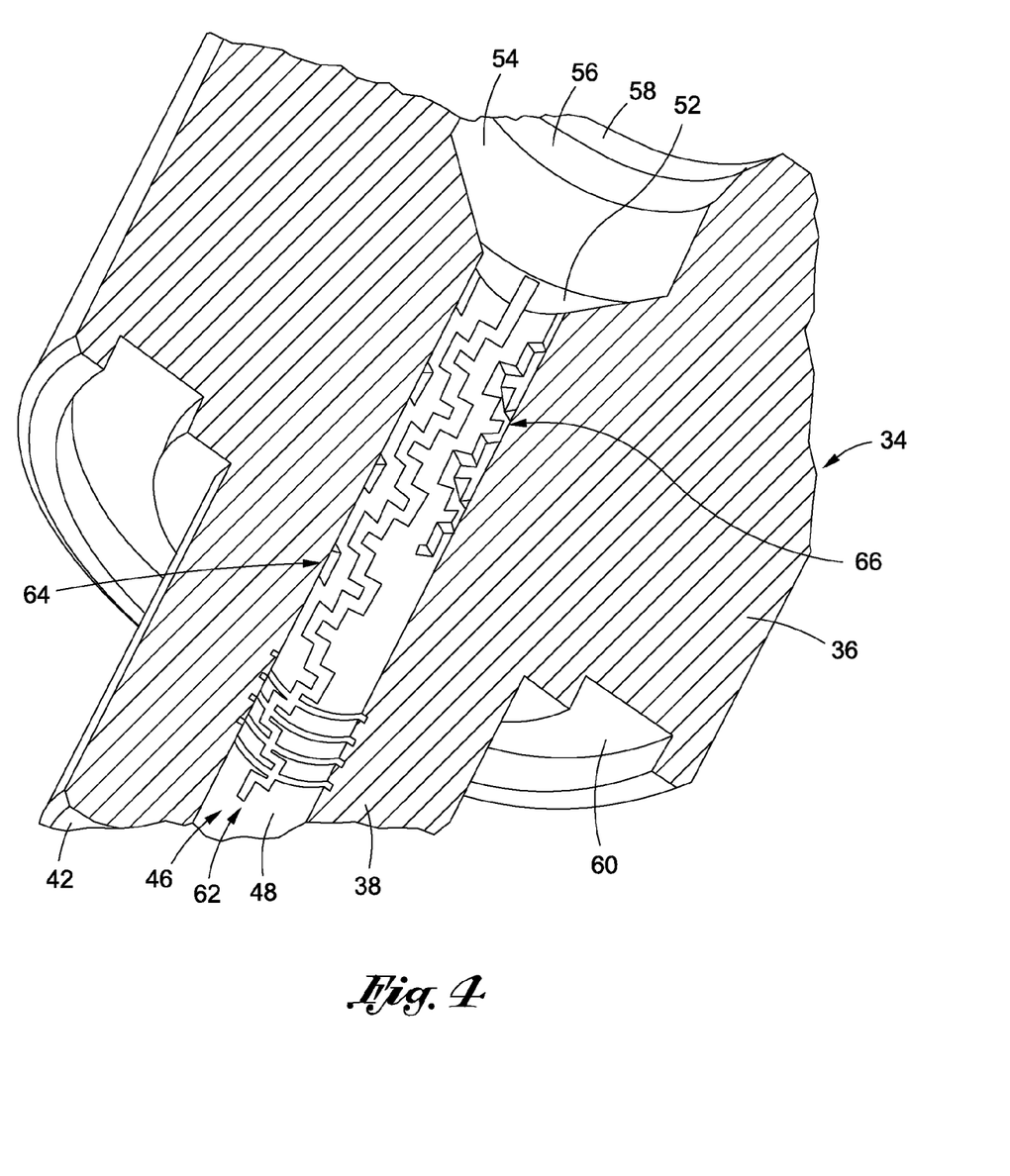
FIG. 4 is a partial cross-sectional, lower perspective view of the seat ring shown in FIG. 3.

In addition to the guide bushing 26, also disposed within the gallery 18 of the body 12 is an annular seat ring 34 which is shown with particularity in FIGS. 3 and 4. As shown in FIGS. 1 and 2, the seat ring 34 is effectively captured between the guide bushing 26 and the valve body 12. When viewed from the perspective shown in FIGS. 1-3, the seat ring 34 defines a cylindrically configured upper portion 36, and a cylindrically configured lower portion 38. The upper portion 36 defines a first, top surface 40 of the seat ring 34, with the lower portion 38 defining an opposed, second or bottom surface 42 thereof. Similar to the guide bushing 26, the upper and lower portions 36, 38 of the seat ring 34 are not of uniform outer diameter. Rather, the outer diameter of the cylindrically configured upper portion 36 exceeds that of the cylindrically configured lower portion 38 such that a continuous, annular shoulder 44 is defined therebetween.

The upper and lower portions 36, 38 of the seat ring 34 collectively define a bore 46 which extends axially through the seat ring 34. As is most easily seen in FIGS. 3 and 4, the bore 46 is also not of a uniform inner diameter. Rather, the bore 46 is collectively defined by a series of discrete inner surface portions of the seat ring 34. More particularly, the majority of the length of the bore 46 is defined by a first inner surface portion 48 of the seat ring 34 which extends within both the upper and lower portions 36, 38 thereof, and is of substantially uniform inner diameter. When viewed from the perspective shown in FIG. 3, the lower end of the first inner surface portion 48 transitions into an outwardly flared or angled second inner surface portion 50 which extends to the bottom surface 42 defined by the lower portion 38. The opposed upper end of the first inner surface portion 48 transitions into an outwardly flared or angled third inner surface portion 52. Due to the angled or beveled configurations thereof, the first and third inner surface portions 48, 52 are not of a uniform inner diameter.

As further seen in FIG. 3, the third inner surface portion 52 transitions into a fourth inner surface portion 54 which is of a uniform inner diameter exceeding that of the first inner surface portion 48. The fourth inner surface portion 54 transitions into an outwardly flared or angled fifth inner surface portion 56 which also does not have a uniform inner diameter. Finally, the fifth inner surface portion 56 transitions into an outwardly flared or angled sixth inner surface portion 58 which extends to the top surface 40 defined by the upper portion 36. The angled or flared sixth inner surface portion 58, which also does not have a uniform inner diameter, defines a seating surface of the seat ring 34 which will be discussed in more detail below. Whereas the second inner surface portion 50 is formed solely within the lower portion 38 of the seat ring 34, the third, fourth, fifth and sixth inner surface portions 52, 54, 56 and 58 are formed solely within the upper portion 36 thereof. As previously explained, the first through sixth inner surface portions 48, 50, 52, 54, 56, 58 collectively define the bore 46 extending axially through the seat ring 34.

As indicated above, within the control valve 10, the seat ring 34 is captured between the guide bushing 26 and the valve body 12. More particularly, the shoulder 44 defined by the seat ring 34 is effectively positioned against a complimentary surface defined by the valve body 12, with the lower portion of the guide bushing 26 being firmly abutted against the upper portion 36 of the seat ring 34, and in particular the top surface 40 defined thereby. Importantly, as seen in FIGS. 1 and 2, the guide bushing 26 and seat ring 34 are positioned relative to each other such that the bore 28 of the guide bushing 26 is coaxially aligned and fluidly communicates with the bore 46 of the seat ring 34. Further, the bore 46 is in direct fluid communication with the inflow passage 14 of the valve body 12 such that fluid flowing through the inflow passage 14 will initially enter the bore 46 through that section thereof defined by the second inner surface portion 50 of the seat ring 34. As best seen in FIG. 4, it is contemplated that the shoulder 44 defined by the seat ring 34 may include a continuous, annular groove 60 which is formed therein and is used to accommodate a sealing member such as an O-ring or gasket which, in the control valve 10, is effectively compressed between the upper portion 36 of the seat ring 34 and the body 12, thus forming a seal therebetween.

As further shown in FIGS. 3 and 4, the seat ring 34 is preferably formed to include a plurality of flow passages which extend within the first and third inner surface portions 48, 52 thereof. In the exemplary embodiment of the seat ring 34 shown in FIGS. 3 and 4, the seat ring 34 is outfitted with a diametrically opposed pair of first flow passages 62, a diametrically opposed pair of second flow passages 64, and a diametrically opposed pair of third flow passages 66. As such, a total of six (6) flow passages 62, 64, 66 are formed within the seat ring 34. In FIGS. 3 and 4, only three (3) of the six (6) total flow passages 62, 64, 66 are shown. Each of the first, second and third flow passages 62, 64, 66 has a generally tortuous, serpentine configuration defining a series of right angle turns. As a result, certain sections or segments of each of the first, second and third flow passages 62, 64, 66 extend in generally parallel relation to the axis of the bore 46, whereas other segments extend generally circumferentially relative thereto.

As best seen in FIG. 3, the first, second and third flow passages 62, 64, 66 are not of uniform length. Rather, the first flow passages 62 are of the greatest length and, in the exemplary embodiment of the seat ring 34 shown in FIG. 3, each define a total of forty-three (43) turns. The second flow passages 64 are of a reduced length in comparison to the first flow passages 62 and each define a total of thirty-three (33) turns. Finally, the third flow passages 66 are of a reduced length in comparison to the second flow passages 64 and each define a total of twenty-two (22) turns. The tortuous regions defined by each of the first, second and third flow passages 62, 64, 66 reside within the first inner surface portion 48 of the seat ring 34. Additionally, when viewed from the perspective shown in FIG. 3, the uppermost ends of the first, second and third flow passages 62, 64, 66 terminate just short of the fourth inner surface portion 54 of the seat ring 34.

In the exemplary embodiment of the seat ring 34 shown in FIGS. 3 and 4, a plurality of (e.g., four) clearance flow control grooves or CFCG's 68 are formed exclusively within the first inner surface portion 48 of the seat ring 34. As seen in FIG. 3, the flow control grooves 68 extend in spaced, generally parallel relation to each other, and are oriented such that each effectively fluidly interconnects the diametrically opposed pair of the first flow passages 62 to each other. The number, depth and spacing of flow control grooves 68, and the use thereof to interconnect the first flow passages 62 in the aforementioned manner, is selected to impart functional features to the seat ring 34 which will be discussed in more detail below.

In addition to the flow control grooves 68, also formed exclusively within the first inner surface portion 48 of the seat ring 34 is a plurality of (e.g., six) annular labyrinth grooves 70. Like the flow control grooves 68, the labyrinth grooves 70 also extend in spaced, generally parallel relation to each other. Additionally, when viewed from the perspective shown in FIG. 3, each of the labyrinth grooves 70 is oriented between the lower ends of the first flow passages 62 and the second inner surface portion 50 of the seat ring 34. The number, depth and spacing of the labyrinth grooves 70 within the seat ring 34 is also selected to impart functional features to the seat ring 34 which will be discussed in more detail below.

As indicated above, the seat ring 34 is preferably fabricated through the use of a direct metal laser sintering (DMLS) process as is described with particularity in Applicant's copending U.S. application Ser. No. 12/018,088 entitled DIRECT METAL LASER SINTERED FLOW CONTROL ELEMENT filed Jan. 22, 2008, the entirety of which is incorporated herein by reference. The use of the DMLS process to facilitate the fabrication of the seat ring 34 allows for the creation of more intricate and complex flow passages therein, including the flow passages 62, 64, 66, the flow control grooves 68, and the labyrinth grooves 70. The DMLS process also allows for the fabrication of the bore 46 with the above-described complex geometry as collectively defined by the first through sixth inner surface portions 48, 50, 52, 54, 56, 58.

Considering the wide range of design variability that is achievable as a result of using the DMLS process to facilitate the fabrication of the seat ring 34, those of ordinary skill in the art will recognize that the particular configuration thereof as described above is exemplary only, and may be varied depending on the desired performance characteristics of any valve fabricated to include the seat ring 34. By way of example and not by way of limitation, potential design variations include: 1) forming the first, second and third flow passages 62, 64, 66 within the first and third inner surface portions 48, 52 to be of identical lengths defining a like number of turns; 2) forming the first, second and third flow passages 62, 64, 66 within the first and third inner surface portions 48, 52 to each be of a prescribed depth which is uniform throughout the length thereof; 3) forming the first, second and third flow passages 62, 64, 66 to each be of a depth which is non-uniform or varied along the length thereof in a prescribed manner; 4) forming the first, second and third flow passages 62, 64, 66 to be of respective ones of two or more differing depths which may be uniform and/or non-uniform throughout the length thereof; 5) forming the first, second and third flow passages 62, 64, 66 such that the various segments thereof are of substantially identical or uniform width along the length thereof; 6) forming the first, second and third flow passages 62, 64, 66 such that the various segments thereof are of widths which are non-uniform or varied along the length thereof in a prescribed manner; 7) forming the first, second and third flow passages 62, 64, 66 to be of respective ones of two or more differing widths which may be uniform and/or non-uniform throughout the length thereof; 8) forming greater of fewer than six flow passages 62, 64, 66 in the seat ring 34 which may be identically configured to each other (i.e., define the same number of turns) or may be provided in differing configurations; 9) forming greater of fewer than six flow passages 62, 64, 66 in the seat ring 34 in any equidistant or non-equidistant spacing arrangement relative to each other; 10) forming greater of fewer than four flow control grooves 68 in the seat ring 34 in any one of a multiplicity of uniform or respective differing depths, and/or in equidistant or non-equidistant spacing relative to each other; 11) forming greater or fewer than six labyrinth grooves 70 in the seat ring 34 in any one of a multiplicity of uniform or respective differing depths, and/or in equidistant or non-equidistant spacing relative to each other; and 12) forming greater or fewer than four clearance flow control grooves 68 in the seat ring 34 in any one of a multiplicity of uniform or respective differing depths, and/or in equidistant or non-equidistant spacing relative to each other. Further, it will be recognized that each of the twelve (12) exemplary design factors set for the above may be combined in manner.

The valve 10 constructed in accordance with the present invention further comprises an elongate, generally cylindrical valve plug 72. As viewed from the perspective shown in FIGS. 1 and 2, the plug 72 includes a cylindrically configured shank portion 74 and a cylindrically configured needle portion 76. The outer diameter of the shank portion 74 exceeds that of the needle portion 76, with the plug 72 thus further defining a beveled portion 78 which facilitates the transition between the shank and needle portions 74, 76 thereof.

In FIGS. 1 and 2, the plug 72 is depicted as being in its closed position within the valve 10. When the plug 72 is in its closed position, the shank portion 74 thereof resides predominantly within the bore 28 defined by the guide bushing 26. Additionally, the needle and beveled portion 76, 78 reside predominantly within the bore 46 of the seat ring 34. More particularly, the outer surface of the beveled portion 78 is in abutting, sealed engagement with the complimentary sixth inner surface portion 58 or seating surface defined by the seat ring 34, with the junction between the beveled and needle portions 78, 76 being located at approximately the transition between the first and third inner surface portions 48, 52 of the seat ring 34. Further, when the plug 72 is in its closed position, the distal end of the needle portion 76 disposed furthest from the beveled portion 78 is disposed at approximately the transition between the first and second inner surface portions 48, 50 of the seat ring 34. In this regard, the axial length of the needle portion 76 of the plug 72 is roughly equal to the axial length of the first inner surface portion 48. Additionally, the outer diameter of the needle portion 76 is sized so as to be just slightly less than the inner diameter of the first inner surface portion 48. Similarly, the outer diameter of the shank portion 74 is sized to be just slightly less than the inner diameter of the bore 28.

Integrally connected to and protruding axially from the shank portion 74 of the plug 72 is an elongate, generally cylindrical stem 80 of the valve 10. The stem 80 protruding from the plug 72 is advanced through the bore 24 defined by the bonnet 20. It is contemplated that the portion of the stem 80 protruding from the bonnet 20 may be mechanically coupled to an actuator which is operative to selectively move the stem 80 in either an upward or downward direction relative to the body 12 and bonnet 20 when viewed from the perspective shown in FIGS. 1 and 2. In this respect, the bore 24 and stem 80 are sized relative to each other such that the stem 80 is slidably moveable within the bore 24 in a reciprocal fashion.

As will be recognized by those of ordinary skill in the art, the selective movement of the stem 80 in an upward or downward direction in turn facilitates the concurrent movement of the plug 72 in an upward or downward direction relative to the guide bushing 26 and seat ring 34. More particularly, the shank portion 74 of the plug 72 is reciprocally moveable upwardly and downwardly relative to the guide bushing 26, with the needle and beveled portions 76, 78 of the plug 72 being reciprocally moveable upwardly and downwardly relative to the seat ring 34. As indicated above, in FIGS. 1 and 2, the plug 72 is shown in its closed or shut-off position, at the downward limit of its movement. Since, as indicated above, the outer diameter of the shank portion 74 is slightly less than that of the bore 28 of the guide bushing 26, and the outer diameter of the needle portion 76 is slightly less than that of that portion of the bore 46 defined by the first inner surface portion 48 thereof, the plug 72 is slidably, reciprocally moveable between its open and closed positions within the bore collectively defined by the coaxially aligned bores 28, 46.

As indicated above, the valve 10, and in particular the plug 72 thereof, is shown in its closed or shut-off position in FIGS. 1 and 2. As also previously explained, when the plug 72 is in its closed position, the beveled portion 78 thereof is firmly seated and sealed against the sixth inner surface portion 58 or seating surface defined by the seat ring 34. As a result, any fluid which flows through the inflow passage 14 and into the bore 46, and migrates between the plug 72 and the seat ring 34, is effectively prevented from flowing from the bore 46 into the enlarged lower portion of the bore 28 (and thus into the outflow passage 16 via the outflow openings 32) by the seal defined between the beveled portion 78 of the plug 72 and the sixth inner surface portion 58 of the seat ring 34. In addition to the beveled portion 78 of the plug 72 being sealed against the sixth inner surface portion 58 of the seat ring 34 when the plug 72 is in its closed position, the entire lengths of those portions of the first, second and third flow passages 62, 64, 66 formed in the first inner surface portion 48 are covered by the needle portion 76 of the plug 72. Thus, though a small amount of fluid may potentially enter such flow passages 62, 64, 66 by seeping or migrating between the outer surface of the needle portion 76 and the first inner surface portion 48, the relative dimensional closeness of the outer diameter of the needle portion 76 to the inner diameter of the first inner surface portion 48 results in any volume of such fluid entering the flow passages 62, 64, 66 being extremely small.

As further viewed from the perspective shown in FIGS. 1 and 2, the movement of the plug 72 to its open position is facilitated by the upward movement of the stem 80 in any amount which is sufficient to cause the beveled portion 78 of the plug 72 to be separated from its sealed engagement to the sixth inner surface portion 58 of the seat ring 34. A more robust opening of the valve 10 which facilitates meaningful fluid flow therethrough occurs when the distal end of the needle portion 76 is elevated above and thus uncovers any portion of the first flow passages 62. As will be recognized, such a level of upward movement of the plug 72, and in particular the needle portion 76 thereof, allows for unrestricted flow of fluid from the inflow passage 14 and into the first flow passages 62.

Subsequent to entering the first flow passages 62, the fluid is forced to flow through those segments (and hence those turns) which remain covered by the needle portion 76. The fluid eventually exits the first flow passages 62 at those sections or segments thereof which extend into the third inner surface portion 52 and are not covered or obstructed by any portion of the plug 72. The fluid exiting these segments of the first flow passages 62 then is able to flow from the bore 46 into the lower portion of the bore 28 as a result of the beveled portion 78 of the plug 72 having been lifted off of and thus separated from its prior sealed engagement to the sixth inner surface portion 58 of the seat ring 34. Upon entering the bore 28, the fluid is able to flow outwardly through the outflow openings 32 within the guide bushing 26, into the gallery 18, and finally into the outflow passage 16.

As will be recognized, and as indicated above, the first flow passages to be uncovered by the retracting plug 72 when the valve 10 is actuated to its open position are the first flow passages 62, followed by the second flow passages 64, and finally by the third flow passages 66. Thus, when viewed from the perspective shown in FIGS. 1 and 2, the upward limit of the stroke of the plug 72 will be such that the distal end defined by the needle portion 76 thereof is positioned at that turn in the flow passages 62, 64, 66 beyond which there is a sufficient number of covered turns for adequate velocity control. Along these lines, an increased level of retraction of the plug 72 from within the seat ring 34, and more particularly an increased level of retraction of the needle portion 76 from within that portion of the bore 46 defined by the first inner surface portion 48, causes the inlet fluid to flow through a lesser number of turns within the flow passages 62, 64, 66 by virtue of the lower portions thereof progressively being uncovered by the retracting plug 72. Thus, as is apparent from the forgoing, flow variation through the valve 10 is affected by the number of turns within the first, second and third flow passages 62, 64, 66 which are exposed/not exposed as the plug 72 reciprocally moves up and down relative thereto. In other words, the length of the flow path from the inflow passage 14 into the bore 28 as collectively defined by the seat ring 34 (including the flow passages 62, 64, 66 formed therein) and the plug 72 is selectively increased or decreased based on the orientation of the plug 72 relative to the seat ring 34, thereby effectuating a change in the flow rate through the valve 10.

As previously explained, the formation of the flow passages 62, 64, 66 in an axial orientation extending in generally parallel relation to the axis of the plug 72 provides the advantage of a compact design, since there is no impact on the diameter of the valve gallery 18, even when additional stages (defined by prescribed numbers of turns in the flow passages 62, 64, 66) are added to the seat ring 34 for an increased pressure drop. This in turn allows for a higher available number of pressure dropping stages at lower opening thresholds of the valve 10, which provides better low range throttling and higher rangeability. Further, velocity control may be insured by providing an adequate number of stages in the seat ring 34 after the full opening of the plug 72, and hence the valve 10. The formation of the flow passages 62, 64, 66 in the seat ring 34 provides the additional advantage of potentially having expanding flow areas from the inflow passage 14 to the bore 28 which assist in optimizing the pressure drop stages, and further increase the aforementioned rangeability of the valve 10. Further, in the valve 10, clearance flow control at the initial movement of the plug 72 from its closed position to its open position is controlled by the labyrinth grooves 70. The flow control grooves 68 formed along the flow path upstream from the labyrinth grooves 70 provide additional clearance flow in lower and mid-range operation of the valve 10. It is contemplated that the flow control grooves 68 will not be used to interconnect dissimilar flow passages (i.e., flow passages having different lengths and/or numbers of turns). In this regard, in the seat ring 34, since the flow passages 62, 64, 66 are all dissimilar to each other, the flow control grooves are only used to interconnect the identically configured first flow passages 62. Since the first flow passages 62 are intersected by a common circumferential plane through the lower portion 38, they are capable of being fluidly interconnected by one common groove extending circumferentially within the first inner surface portion 48.

Based on the aforementioned description of fluid flow through the valve 10, such valve 10 is configured for under plug flow. However, those of ordinary skill in the art will recognize that the valve 10, and in particular the seat ring 34 and plug 72 thereof, may alternatively be configured for over plug flow without departing from the spirit and scope of the present invention. Along these lines, those of ordinary skill in the art will further recognize that the configuration of the valve 10 described above is exemplary only, and that it is contemplated that the seat ring 34 and plug 72, having the above-described collective structural and functional features, may be integrated into a control valve 10 having structural features differing from those described above in relation to the valve 10. In this regard, the present invention is focused in large measure upon the uniquely configured seat ring 34 manufactured through the use of the aforementioned DMLS process.

As is apparent from the foregoing, the use of the DMLS process to facilitate the formation of the plug 34 allows for the formation of flow passage(s) (such as the flow passages 62, 64, 66) therein with an high level of intricacy or complexity, and in virtually an unlimited number of potential design variations, thus providing for an extremely high level of customization or optimization of the valve 10, and in particular the flow characteristics thereof. Thus, the valve 10 may be customized to provide better velocity control, especially for smaller openings thereof, since a greater number of stages or turns may be made available to drop the pressure of fluid flowing therethrough the flow passage(s). Further, for the full opening of the valve 10, velocity control maybe ensured by providing a suitable number of stages or turns. Since the stages or turns are added along the axis of the plug 72, there is no change in the diameter of the gallery 18, thus providing a compact design. As previously explained, in the valve 10, the flow at a given opening of the plug 72 is affected by the pressure drop in the downstream stages of the particular opening. Stated another way, Cv variation is through the number of stages or turns of the flow passage(s) covered/uncovered as the plug 72 moves up and down, with the pressure drop staging ratio (expansion coefficient) affecting the Cv characteristic and rangeability of the valve 10.

Figure 5:
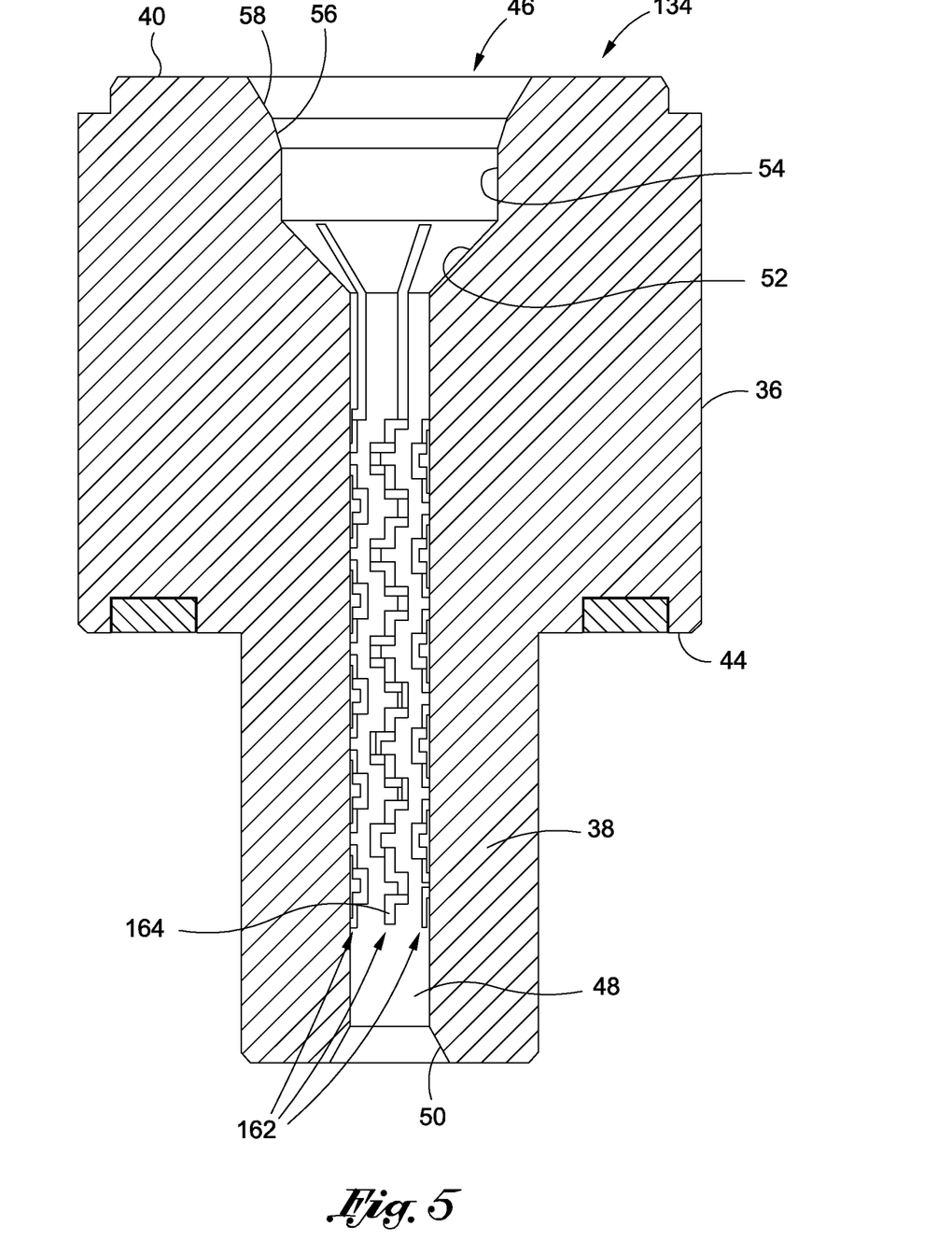
FIG. 5 is a cross-sectional view of another exemplary embodiment of the seat ring of the control valve shown in FIGS. 1 and 2.

As indicated above, one of the contemplated variants for the seat ring 34 is the formation of the first, second and third flow passages 62, 64, 66 to be of identical lengths defining a like number of turns. Referring now to FIG. 5, there is shown a seat ring 134 which comprises a variant of the above-described seat ring 34. More particularly, the primary distinction between the seat rings 34, 134 lies in the seat ring 134 including a total of six (6) flow passages 162 which are identically configured to each other, and thus are of equal lengths, while defining an equal number of turns. In the embodiment of the seat ring 134 shown in FIG. 5, the length and number of turns defined by each of the flow passages 162 is preferably identical to those defined by each of the first flow passages 62 of the seat ring 34.

Figure 6:
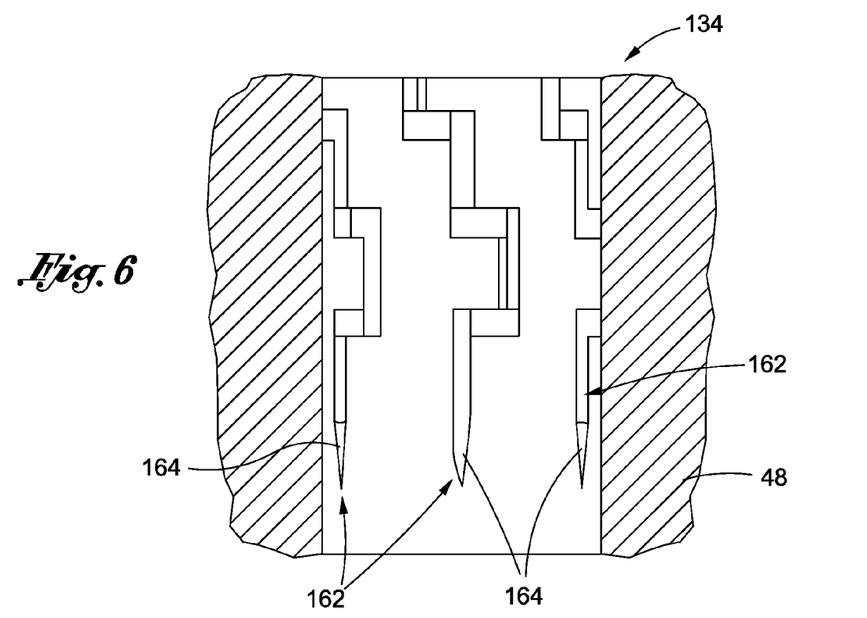
FIG. 6 is an enlargement of a portion of the seat ring shown in FIG. 5, depicting the specialized configurations of the inlets of the flow passages thereof.

Referring now to FIG. 6, though the flow passages 162 and the first flow passages 62 are substantially identical to each other as described above, the flow passages 162 may be formed to include a structural variant in comparison to the first flow passages 62. When viewed from the perspective shown in FIGS. 5 and 6, this particular structural variant comprises forming the lowermost, inflow end 164 of each flow passage 162 to have a width and/or depth which differs from those of each of the segments thereof disposed downstream from the inflow end 164. The formation of the flow passages 162 with the aforementioned variable width and/or depth inflow ends 164 provides enhanced throttling functionality for fluid flowing therethrough.

Other than for the seat ring 134 including the flow passages 162 with the inflow ends 164 as an alternative to the above-described flow passages 62, 64, 66, the seat rings 34, 134 are identically configured to each other in all other respects. Along these lines, although the above-described flow control grooves 68 and labyrinth grooves 70 are not shown in FIG. 5 for purposes of clearly depicting the flow passages 162, such flow control grooves 68 and labyrinth grooves 70 are depicted in the partial perspective view of the seat ring 134 included in FIG. 7. Those of ordinary skill in the art will recognize that within the seat ring 34, the lowermost inflow ends of the first, second and third flow passages 62, 64, 66 may alternatively be configured to mirror the structural features of the inflow ends 164 of the flow passages 162 as described above in relation to FIG. 6. Those of ordinary skill in the art will further recognize that the flow passages 162 included in the seat ring 34 may be modified in accordance with each of the twelve (12) exemplary design factors set forth above in any combination without departing from the spirit and scope of the present invention. Still further, it is contemplated that either of the seat rings 34, 134 may be modified to omit the flow control grooves 68 and/or labyrinth grooves 70.

Figure 7:
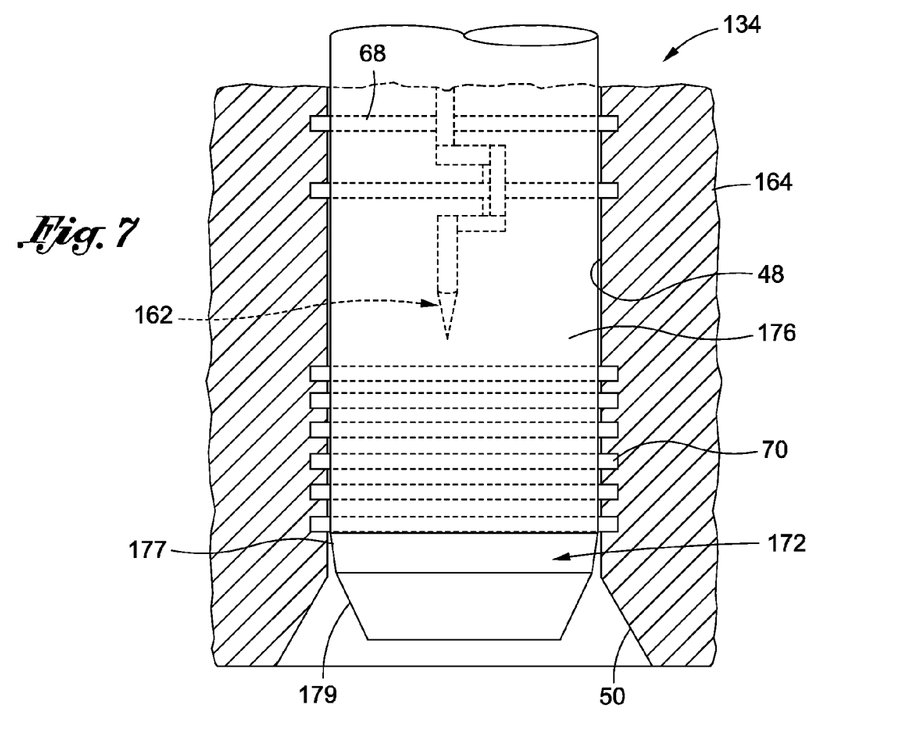
FIG. 7 is a partial perspective view of the seat ring shown in FIG. 5, further depicting a portion of a modified version of the control valve plug disposed and reciprocally movable therein.

FIG. 7 further depicts a portion of a valve plug 172 which is used in conjunction with the seat ring 134. The plug 172 is structurally similar to the above-described plug 72, with the sole distinction lying in the structural features of the needle portion 176 of the plug 172 in comparison to the needle portion 76 of the plug 72. More particularly, in the plug 72, the cylindrical needle portion 76 defines a planar distal end, with no transitional surface being defined between the outer surface of the needle portion 76 and such distal end. In contrast, in the modified plug 172, the needle portion 176 thereof defines an adjacent pair of tapered surfaces 177, 179. In the plug 172, these tapered surfaces 177, 179 define the transition between the outer surface of the needle portion 176 and the planar distal end thereof. These tapered surfaces 177, 179 of the plug 172 provide enhanced throttling when the plug 172 is initially actuated from its closed position shown in FIG. 7 to an open position. Though being shown in FIG. 7 in combination with the seat ring 134, those of ordinary skill in the art will recognize that the valve plug 172 may also be used in conjunction with the above-described seat ring 34.

Figure 8:
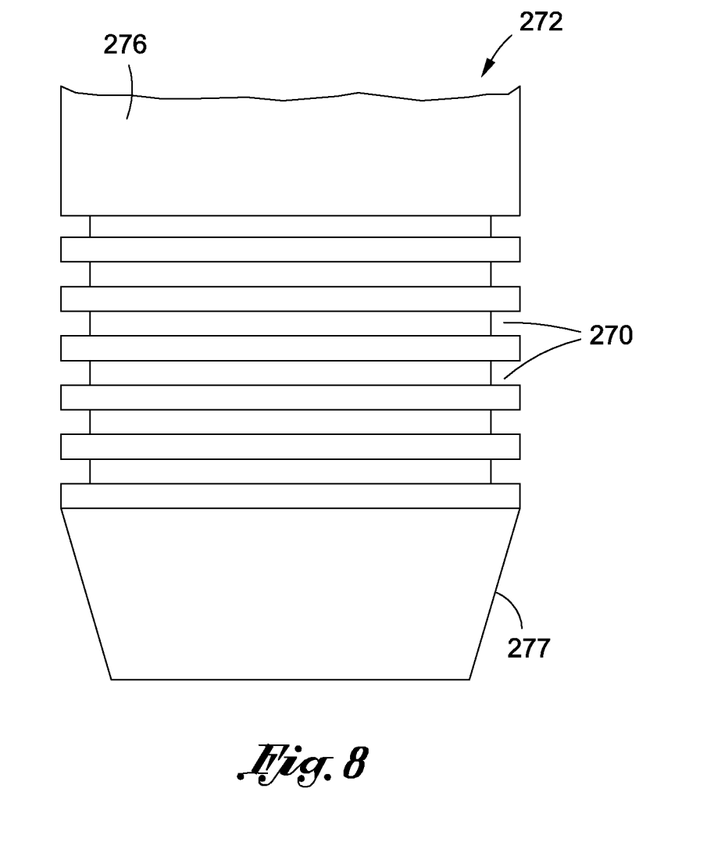
FIG. 8 is a partial perspective view of a further modified version of a control valve plug which may be used in conjunction with the seat rings shown in FIGS. 3 and 5 and is formed to include a series of labyrinth grooves therein.

Referring now to FIG. 8, there is shown a portion of a plug 272 which comprises a further variant of the plug 72 described above. Similar to the plug 172, the cylindrical needle portion 276 of the plug 272 defines a tapered surface 277. This tapered surface 277 defines the transition from the outer surface of the needle portion 276 to the planar distal end thereof. The tapered surface 277 is adapted to mirror the functionality of the tapered surfaces 177, 179 of the plug 172.

Additionally, in the plug 272, the outer surface of the needle portion 276 includes a series (e.g., six) annular labyrinth grooves 270 formed therein, adjacent the tapered surface 277. The labyrinth grooves 270 extend in spaced, generally parallel relation to each other. It is contemplated that the valve plug 272 may also be used in conjunction with either of the above-described seat rings 34, 134. In this regard, in the plug 272, the labyrinth grooves 270 are intended to replace the labyrinth grooves 70 formed in either the seat ring 34 or the seat ring 134. Stated another way, rather than forming the labyrinth grooves 70 within either the seat rings 34, 134, the labyrinth grooves 270 which mimic the functionality of the labyrinth grooves 70, are instead formed directly within the needle portion 276 of the plug 272.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A multi-stage control valve, comprising:
a valve body;
a seat ring disposed within the valve body and including:
a first inner surface portion at least partially defining a generally cylindrical bore which extends through the seat ring along an axis; and
a plurality of flow passages formed in the first inner surface portion to prescribed lengths and extending in generally parallel relation to the axis of the bore, the plurality of flow passages being formed in prescribed orientations relative to each other, each flow passage having a tortuous configuration defining a series of right angle turns and including at least first sections which each extend in generally parallel relation to the axis of the bore and second sections which each extend generally circumferentially relative to the axis of the bore, at least two of the flow passages being of differing lengths relative to the axis of the bore, the plurality of flow passages including:
a diametrically opposed pair of first flow passages which are each of a first length;
a diametrically opposed pair of second flow passages which are each of a second length less than the first length; and
a diametrically opposed pair of third flow passages which are each of a third length less than the second length;
a valve plug advanced through the bore and reciprocally movable along the axis thereof in a manner which allows for selective variations in a portion of the length of the flow passages covered thereby.

2. The valve of claim 1 wherein the seat ring further includes at least one flow control groove which is formed within the first inner surface portion thereof and fluidly connects at least two of the flow passages to each other.

3. The valve of claim 1 wherein the seat ring further includes at least one labyrinth groove which is formed within the first inner surface portion thereof in spaced relation to the flow passages.

4. The valve of claim 1 wherein each of the flow passages defines an inflow end portion having at least one of a width and a depth which varies from that of the remainder thereof.

5. The valve of claim 4 wherein the seat ring further includes at least one flow control groove which is formed within the first inner surface portion thereof and fluidly connects the first flow passages to each other.

6. The valve of claim 1 wherein:
the first flow passages each define forty-three right angle turns;
the second flow passages each define thirty-three right angle turns; and
the third flow passages each define twenty-two right angle turns.

7. The valve of claim 1 wherein:
each of the first, second and third flow passages defines an inflow end portion; and
the seat ring further includes at least one labyrinth groove which is formed within the first inner surface portion thereof proximate the inflow end portions of the first flow passages.

8. The valve of claim 1 wherein the valve plug includes at least one labyrinth groove which is formed therein.

9. A multi-stage control valve, comprising:
a valve body;
a seat ring disposed within the valve body and including:
at least first and second inner surface portions which collectively define at least a portion of a generally cylindrical bore which extends through the seat ring along an axis, the second inner surface portion being outwardly flared relative to the first inner surface portion; and
a plurality of flow passages which are each formed in the first and second inner surface portions to a prescribed length and such that a portion of each of the flow passages which is formed in the first inner surface portion extends in generally parallel relation to the axis of the bore, and has a tortuous configuration including at least first sections which each extend in generally parallel relation to the axis of the bore and second sections which each extend generally circumferentially relative to the axis of the bore;

a valve plug advanced through the bore and reciprocally movable along the axis thereof in a manner which allows for selective variations in a portion of the length of at least one of the flow passages covered thereby.

10. The valve of claim 9 wherein at least two of the flow passages are of differing lengths relative to the axis of the bore.

11. The valve of claim 10 wherein the seat ring further includes at least one flow control groove which is formed within the first inner surface portion thereof and fluidly connects at least two of the flow passages to each other.

12. The valve of claim 11 wherein the valve plug includes at least one labyrinth groove which is formed therein.

13. The valve of claim 10 wherein the flow passages are provided in at least two diametrically opposed pairs thereof, with the flow passages of each of the diametrically opposed pairs being of identical lengths.

14. The valve of claim 13 wherein the seat ring further includes at least one flow control groove which is formed within the first inner surface portion thereof and fluidly connects the flow passages of one of the diametrically opposed pairs thereof to each other.

15. The valve of claim 14 wherein:
each of the flow passages defines an inflow end portion; and
the seat ring further includes at least one labyrinth groove which is formed within the first inner surface portion thereof proximate the inflow end portions of one of the diametrically opposed pairs of the flow passages.

16. The valve of claim 9 wherein each of the flow passages defines an inflow end portion having at least one of a width and a depth which varies from that of the remainder thereof.

17. A multi-stage control valve, comprising:
a valve body;
a seat ring disposed within the valve body and including:
a first inner surface portion at least partially defining a generally cylindrical bore which extends through the seat ring along an axis;
a plurality of flow passages formed in the first inner surface portion to prescribed lengths and extending in generally parallel relation to the axis of the bore, the plurality of flow passages being formed in prescribed orientations relative to each other, each flow passage having a tortuous configuration defining a series of right angle turns and including at least first sections which each extend in generally parallel relation to the axis of the bore and second sections which each extend generally circumferentially relative to the axis of the bore; and
at least one flow control groove which is formed within the first inner surface portion thereof and fluidly connects at least two of the flow passages to each other, the at least two of the flow passages connected via the at least one flow control groove having separate inlet ends; and
a valve plug advanced through the bore and reciprocally movable along the axis thereof in a manner which allows for selective variations in a portion of the length of the flow passages covered thereby.

18. The multi-stage control valve recited in claim 17, wherein each flow control groove fluidly interconnects every flow passage which intersects a common plane.

19. The multi-stage control valve recited in claim 17, wherein the at least one flow control groove fluidly interconnects a diametrically opposed pair of the plurality of flow passages.

20. The multi-stage control valve recited in claim 17, wherein the at least one flow control groove forms a continuous ring around the bore.

* * * * *